(12) United States Patent
Mehrtens et al.

(10) Patent No.: US 8,002,442 B2
(45) Date of Patent: Aug. 23, 2011

(54) COLOR FILTER AND METHOD FOR ITS MANUFACTURE

(75) Inventors: Andree Mehrtens, Gruenenplan (DE); Lutz Zogg, Bad Gandersheim (DE)

(73) Assignee: Schott AG (DE)

( * ) Notice: Subject to any disclaimer, the term of this patent is extended or adjusted under 35 U.S.C. 154(b) by 421 days.

(21) Appl. No.: 12/269,414

(22) Filed: Nov. 12, 2008

(65) Prior Publication Data
US 2009/0190226 A1    Jul. 30, 2009

(30) Foreign Application Priority Data

Nov. 14, 2007  (DE) .......................... 10 2007 054 701

(51) Int. Cl.
| | |
|---|---|
| *F21V 9/00* | (2006.01) |
| *G02B 5/28* | (2006.01) |
| *G03B 21/24* | (2006.01) |
| *G03B 21/32* | (2006.01) |
| *B05D 5/06* | (2006.01) |

(52) U.S. Cl. ............ 362/293; 359/589; 353/84; 352/42; 427/164

(58) Field of Classification Search .................. 359/580, 359/581, 586, 587, 588, 589, 885; 362/293; 353/84, 32; 352/42; 427/164
See application file for complete search history.

(56) References Cited

U.S. PATENT DOCUMENTS

| | | | |
|---|---|---|---|
| 4,914,556 A | 4/1990 | Richardson | |
| 5,371,543 A * | 12/1994 | Anderson | ..................... 348/270 |
| 5,711,889 A | 1/1998 | Buchsbaum | |
| 2004/0027652 A1 | 2/2004 | Erdogan et al. | |
| 2005/0153219 A1 | 7/2005 | Buchsbaum et al. | |
| 2006/0007686 A1 | 1/2006 | Hough | |

FOREIGN PATENT DOCUMENTS

| | | |
|---|---|---|
| EP | 1 099 962 A1 | 5/2001 |
| GB | 629266 A | 9/1949 |
| JP | 2000304971 A | 11/2000 |
| WO | 01/37032 A2 | 5/2001 |

OTHER PUBLICATIONS

V. Verdrager, "EP Patent Application No. EP 08 01 9819 International Search Report", Jan. 26, 2009, Publisher: EPO, Published in: EP. German Office Action for Application 10 2007 054 701.5-51, German Patent Office, May 20, 2008, Dr. Maechtle.

* cited by examiner

*Primary Examiner* — Alessandro Amari
(74) *Attorney, Agent, or Firm* — DeMont & Breyer LLC (57) ABSTRACT

A color filter (1) for illumination purposes, such as, for example, for stage illumination is proposed, which comprises a full-surface antireflection layer (3) and an additional, multilayered structured interference filter layer (4) arranged on it.

12 Claims, 11 Drawing Sheets

COLOR FILTER AND METHOD FOR ITS MANUFACTURE

The invention relates in general to color filters with interference layer systems, particularly color filters that are used, for example, in illumination systems for stages.

EP 0621495 A describes a color cross-fade system for a lamp, which comprises a filter that can be adjusted continuously by rotation. This filter has a layer system that is designed as an edge filter and is produced in such a way that the spectral cut off edge varies along the peripheral direction.

WO 9913267 A and EP 0583048 A describe such a principle of a filter that can be adjusted by rotation. The layer thicknesses of the layers of the dichroic filter coating are varied continuously along the surface.

Although the disadvantage here is that while the color tints can be chosen in any desired way, an adjustment of the color saturation is not possible.

U.S. Pat. No. 4,914,556 A describes a floodlight with several series-connected rotating dichroic color filters, where the filter material is applied as a pattern with variable density. Depending on the density of the areas of the filter that are placed in the light path, the color saturation of the color that has been filtered with the filter in question can be adjusted.

A similar optical system for generating colored light fields for stage illumination is also known from WO 01/037032 A2. The optical system is based on a subtractive color mixing. The principle of this system is based on a set of dichroic filters that reflect certain spectral portions and transmit other spectral portions. The series connection of the filters produces the desired color tint. To achieve a continuous regulation of the color tint and of the color saturation, the filters are structured in such a way that they have both filtering and nonfiltering areas. White light exits from the nonfiltering area, and then influences the color saturation as an exiting white portion and/or can be filtered by an exit-side filter to change the color tint.

However, in the systems as known from WO 01/037032 A2 and U.S. Pat. No. 4,914,556 A, it is disadvantageous that reflections can occur at areas of the filter that transmit white light, which reduce the brightness of the floodlight. In addition, multiple reflections can occur inside the successively arranged individual filters, leading to color distortions.

If one then wishes to make the substrate of the filter nonreflective, an additional problem arises, namely the antireflection layer and the color filter layer influence each other mutually as interference layer systems. This can lead to shifting the chromatic coordinate of a combined antireflection and color layer system with respect to the calculated properties of the color system.

To prevent this, both the color layer system and the antireflection layer have been structured to date in such a way that the two layer systems are arranged next to each other on complementary areas of the substrate surface.

However, this manufacturing method requires multiple masking and is therefore correspondingly expensive.

The invention is therefore based on the problem of simplifying the manufacture of structured color filters for illumination purposes. This problem is solved by the object of the independent claims. Advantageous embodiments and variants of the invention are indicated in the corresponding dependent claims.

Accordingly, the invention provides a method for manufacturing a color filter for the generation of colored light fields for the illumination of surfaces, in which an interference-antireflection layer is produced over the entire surface of a flat, transparent substrate, which hereafter is also referred to as an antireflection layer system or AR layer system, on at least one side, particularly preferably on both sides, the substrate is then provided on the side coated with the interference-antireflection layer with a masking, which covers areas of the side, and then an additional, multilayered interference filter layer is deposited on the masked side, which comprises alternately first and second layers, where the first layers have a first refractive index and the second layers have a second refractive index that differs from the first refractive index of the first layers, where the layer thicknesses of the layers of the additional, multilayered interference filter layer are designed taking into consideration the underlying interference-antireflection layer so that the additional, multilayered interference filter layer together with the interference-antireflection layer produces a color filter layer system that has at least one edge in the transmission spectrum in the visible spectral range that separates a reflecting wavelength range from a wavelength range within which light is transmitted through the color filter layer system, and where the masking is removed after the separation of the additional, multilayered interference filter layer, so that the additional, multilayered interference filter layer covers at least one first area of the substrate and leaves at least one second area uncovered, and the second area is made antireflective as a result of the interference-antireflection layer. As the visible spectral range, one can here use in general the range from 400 to 800 nm wavelength.

According to the invention, a color filter layer system is thus provided in which an AR layer system is located under the color filter stack proper, and in which the color filter stack that is applied to this AR stack has been calculated, as far as its layer sequence is concerned, so that it, together with the underlying layers of the AR stack, reaches precisely the desired color effect, i.e., the desired (x/y) or (u'/v') color coordinates are obtained. In the case of color filters, this usually occurs by transmission. However, it would also be conceivable to design a filter for reflections.

Such a color filter is preferably designed for filtering only a certain color, or for generating a certain color tint, but with color saturation that varies, in some areas, along the substrate surface. The filter can then be designed particularly in such a way that the color saturation can be adjusted by rotation of the filter.

The AR layer system here lies under the color filter stack, i.e., the AR layers are applied first, and only then the layer sequence of the color filter stack.

It is essential for this invention that the color filter stack is not applied later to all the parts of the substrate, rather some parts of the substrate remain that are provided with a pure antireflection layer. For this purpose, after the application of the AR coating, a masking process takes place, which covers parts of the already applied AR coating. After the subsequent application of the color filter stack and the separation of the masking, partial areas thus remain on the substrate that are provided with a color filter stack, while other areas of the substrate are antireflective.

The color filter stack applied in the process can generally not achieve the desired color coordinates on its own; rather, the latter are achieved in an exact way only together with the underlying AR layer system.

As a result of the sequence according to the invention, one has complete freedom in choosing the underlying AR coating. Thus, it is possible to apply an antireflection coating to substrates with a coating system and provide them subsequently after the masking process with the color filter stack in another coating system. One great advantage here is to apply the AR coating cost-effectively in a large system (on at least one side, but advantageously particularly on both sides).

Thus it is possible to use substrates that have been made antireflective in a cost-effective way on a large industrial scale in continuous systems for making display case glass or shop display windows antireflective, for example. From glasses that have thus been made antireflective and are produced on larger surface areas (typically from 1 m×2 m to 3×6 m), a multitude of substrates can be cut to the desired size and shape, and the separate substrates that have been made antireflective (on both sides) are then provided with the color filter stack in the subsequent masking step in the other coating system. Therefore, it is also advantageous to use different separation systems for the interference-antireflection layer and the additional, multilayered interference filter layer. Furthermore, in this embodiment of the invention, the interference-antireflection layer is thus applied to a preliminary substrate, from which the substrate is then detached, where the additional, multilayered interference filter layer is applied only after the substrate has been detached.

Alternatively, it is also possible to carry out the coating with the color filter stack already on the preliminary substrate. In this variant of the invention, both the interference antireflection layer, and also the additional, multilayered interference filter layer are applied to a preliminary substrate and then the substrate is separated out.

Large-surface substrates are often made antireflective by liquid coating, for example, in the above-mentioned continuous systems. It is therefore also advantageous for the interference-antireflection layer to be produced by immersion coating, or immersion drawing and/or in the sol-gel procedure. Sol-gel separation within immersion coating allows a good control of the layer thickness; however, other liquid coating procedures, such as spray coating, are also conceivable, provided the layer thickness can be adjusted with sufficient precision.

It is particularly advantageous, especially in the above-described embodiments, in which a preliminary substrate is used, to apply the interference-antireflection layer and the additional, multilayered interference filter layer using different deposition procedures. This is possible because the antireflection layer can be applied over the entire surface and in an unstructured state.

For coating the additional, multilayered interference filter layer, vacuum deposition is preferred. This is advantageous because this filter layer in general has more layers than the interference antireflection layer, and the chromatic coordinate depends with sensitivity on the layer thicknesses of the layers. Vacuum deposition here offers the advantage of a very precise control of the layer thicknesses. It is preferred here to consider sputtering as the deposition method.

Moreover, to reach a good color filtration, an additional, multilayered interference filter system, preferably taking into consideration the interference-antireflection layer, is designed and applied in such a way that on average at least 75%, preferably on average at least 90%, and particularly preferably on average more than 95% of the light is reflected in a reflecting wavelength range with a spectral width of at least 60 nm that abuts the edge. To achieve this reflection value, the layer system is produced with correspondingly many layers. For this purpose, it is preferred that the additional, multilayered interference filter layer contain at least 15, advantageously at least 20 layers, where first layers with a first refractive index alternate with layers with a higher refractive index. For the interference-antireflection layer, at least three, preferably at least four layers, particularly preferably six layers are advantageous to achieve an effective antireflection. At least four layers are advantageous if the antireflection layer is produced with alternating high refractive index and low refractive index layers, where the high refractive index layers, just like the low refractive index layers, in each case have the same refractive index. Such layers can be produced well by vacuum deposition, particularly by sputtering. With liquid layers, mixed oxide layers with a medium refractive index can also be produced in a simple way. In this case, good antireflection can be produced even with three layers.

For the layers with higher refractive index of the interference antireflection layer and of the additional, multilayered interference filter layer, it is preferred to use titanium oxide, niobium oxide, zirconium oxide, tantalum oxide, as high refractive index oxides. The materials can optionally also be deposited as mixed oxides, i.e., in connection with other oxides. For the layers with a first refractive index, one can consider using particularly silicon oxide ($SiO_2$) as a material with a comparatively low refractive index.

To allow a complete color mixing, it is preferred to connect several color filters according to the invention in series. By positioning the filters appropriately, one can then filter out, by back reflection in each case, certain intensity portions of the visible frequency spectrum. Filters that have two edges in the visible spectrum are of particularly critical importance with a view to the chromatic coordinate. If only one of the edges deviates from the calculated spectral position, a noticeable shift of the chromatic coordinate occurs rapidly. A change in the spectral profile of the reflectivity into reflecting wavelength ranges that abut the edge is particularly critical here. It has been found that the invention not only allows a simplified manufacture; filters with two edges and unchanging color properties can also be produced in a technically reliably controllable production process. In a variant of the invention, the additional, multilayered interference layer is, for that purpose, calculated taking into consideration the interference-antireflection layer and applied in such a way that a color filter layer system is obtained that has two edges in the transmission spectrum in the visible spectral area, where a first edge is located in the range of 435-495 nm, preferably 440-460 nm, and a second edge in the range of 600-640 nm, preferably 605-630 nm wavelength, and where the color filter layer system reflects in the wavelength range between these edges, so that magenta colored light is obtained from white light, after the transmission through the area that is covered with a color filter layer system.

In the sense of the invention, these edge positions refer to the 50% absolute measured value in transmission, as would be measured directly with a spectrometer.

Such a filter can then be used in combination with a filter that reflects red light (thus transmitting cyan) and a filter that reflects blue light (thus transmitting yellow) to achieve complete color mixing in an illumination system.

Moreover, it has been found to be advantageous for the interference-antireflection layer and the additional, multilayered interference filter layer to be produced in each case with layers having a first refractive index and layers with a higher refractive index, where the layers with higher refractive index of the additional, multilayered interference filter layer are produced from a material that differs from the layers with higher refractive index of the interference-antireflection layer. It has been observed that the materials having different, high refractive indexes lead to some interference optical decoupling of the layer system, so that the chromatic coordinate of the overall coating system reacts less sensitively to production-induced variations in the layer thicknesses.

The color filter produced therefrom to generate colored light fields for illumination purposes accordingly has, on a flat transparent substrate, an interference-antireflection layer over its entire surface, at least on one side, particularly preferably on both sides, where
- an interference antireflection layer is applied over the entire surface of a flat transparent substrate on at least one side, particularly preferably on both sides, where
- an additional, multilayered interference filter layer comprising alternately first and second layers is deposited on the mask side, where the first layers have a first refractive index and the second layers have a second refractive index, which is higher than the first refractive index of the first layers, and where
- the interference-antireflection layer has at least one first and at least one second layer, where the refractive index of the second layer is higher than the refractive index of the first layer, and where
- the materials of the second layers of the additional, multilayered interference filter layer and of the second layer of the interference-antireflection layer differ from each other, and where
- the layer thicknesses of the additional, multilayered interference filter layer, taking into consideration the underlying interference-antireflection layer, are designed in such a way that the additional, multilayered interference filter layer together with the interference-antireflection layer produces a color filter layer system that has at least one edge in the transmission spectrum in the visible spectral range that separates a reflecting wavelength range from a wavelength range, within which light is transmitted by the color filter layer system, and where
- the additional, multilayered interference filter layer covers at least one first area of the substrate and leaves at least one second area uncovered, and the second area is made antireflective as a result of the interference-antireflection layer.

In an illumination system with such a color filter, or in a color filter as obtained by the method according to the invention, several, preferably three, such color filters are then arranged in series along the light path, the color filters having edges at, in each case, different places of the visible spectral range. Using the color filters, the color saturation can then be varied for each different color so that any desired color can be adjusted with the desired color saturation.

According to a variant of this embodiment, an interference-antireflection layer with zirconium oxide- or titanium oxide-containing layers with higher refractive index is applied, and an additional, multilayered interference filter layer with niobium oxide is applied, particularly with niobium pentoxide-containing layers having a higher refractive index. In the case of a magenta-colored filter, it was possible to detect a significantly reduced sensitivity of the chromatic coordinate, or of the spectral position of the edges, to variations in the layer thicknesses.

To allow a variable color saturation with the filter, one also provides for the color filter layer system to be arranged on the substrate in adjacent tooth-shaped areas that narrow in the longitudinal direction, so that, as a result of the narrowing of the adjacent areas, the areas that are provided with an antireflection layer have a width that is variable in the direction along the teeth. This substrate can additionally have a cut-out to be able to adjust the color filter in the light path of an illumination system in such a way that the light passes at least partially through the cut-out.

The tooth-shaped areas can run in a circular pattern or a spiral pattern with curvature about a point of rotation. This allows an easy setting of the desired color saturation by rotating the filter. It is particularly advantageous here for the substrate to have a circular base pattern. Alternatively, a translational movement can also be carried out for adjusting the color saturation. In this case, the tooth-shaped areas can run, for example, along a straight line. It is advantageous in all cases that at least one component of the longitudinal direction of the tooth-shaped areas lies in the direction of movement of the substrate during the adjustment of the color saturation.

To obtain an optimally high insensitivity of the chromatic coordinate of the overall layer system to individual, manufacture-related, variations in the thicknesses of individual layers, the first-order layer thickness sensitivity can be calculated for the design of the layers. If this sensitivity is positive and relatively high for certain layers, these layers have a disproportional influence on the chromatic coordinate, if their layer thickness deviates from the calculated layer thickness.

To calculate the layer thicknesses of the color filter layer system, it is further advantageous to use predetermined layer thicknesses of the multilayered antireflection layer, and keep them fixed, to calculate the layer thicknesses of the remaining layers, or of the layers of the additional, multilayered interference filter layer. This then makes it possible to use available antireflective substrates as a starting point and an already tried and proven manufacturing process for the antireflection layer.

The invention will be explained in detail below using examples and in reference to the appended drawing. Identical reference characters in the drawings here refer to identical or corresponding parts. In the drawing.

Figure 1:
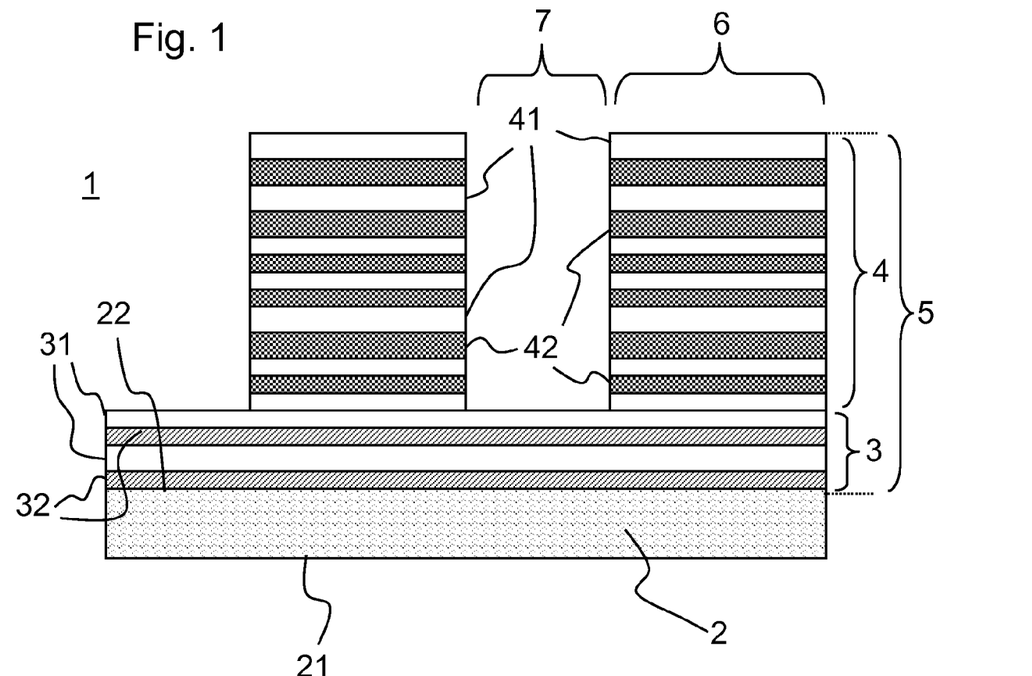
FIG. 1 shows a schematic cross-sectional view of a color filter produced according to the invention.

The principle of a color filter 1 produced according to the invention with an antireflective substrate 2 is represented in FIG. 1. Here, the substrate 2 was first made antireflective on its entire surface at least on one side, but preferably on both sides, and the color filter layer system is then applied, after the masking process, at places that are predetermined by the masking.

In the example shown in FIG. 1, the interference antireflection layer 3 is applied as an example to the disk-shaped substrate 2 with sides 21, 22, only on the side 22. The interference antireflection layer 3 comprises several alternately arranged first and second layers 31, 32. Here the layers 32 have a higher refractive index than the first layers 31. For the first layers 31, one can use, for example, silicon oxide as the low refractive index layer material.

On this side 22, the substrate 2 is then provided with a masking, which covers the area 7 of the side 22. Then, an additional, multilayered interference filter layer 4 is deposited on the masked side 22 and comprises alternately first and second layers 41, 42, where the first layers 41 have a first refractive index and the second layers 42 have a second refractive index that differs from the first refractive index of the first layers 41. Here too, the refractive index of the second layers 42 is higher than the refractive index of the first layers 41.

The layer thickness of the refractive layers of the additional, multilayered interference filter layer 4 are designed, taking into consideration the underlying interference antireflection layer (3), in such a way that the additional, multilayered interference filter layer 4 together with the interference antireflection layer 3 produces a color filter layer system 5. This color filter layer system 5 comprises an edge in the transmission spectrum in the visible spectral area, which separates a reflecting wavelength range from a wavelength range within which light is transmitted by the color filter layer system. To be able to generate all the colors of visible lights with variable color saturation, several such color filters 1 can then be connected one after another, where the color filters in each case filters out different colors.

After the deposition of the additional, multilayered interference filter layer 4, the mask is then removed together with the parts of the deposited multilayered coating have on the mask. As a result, a structured filter layer 4 is obtained, which covers the first area 6 of the substrate 2 and leaves the second area 7 uncovered. The second areas that have been left uncovered are then made antireflective due to the interference-antireflection layer 3.

As layer materials for the layers 32 and 42, one can consider using, among other compounds, titanium oxide, niobium oxide, zirconium oxide, tantalum oxide and their mixed oxides. These layers 32 can here also differ in their composition from the layers 42, as also shown in FIG. 1 by different cross hatching. Thus, for example, it is also possible to use, in the AR coating, $TiO_2$ as high refractive index material, but $ZrO_2$ and/or $Nb_2O_5$ in the layer system 4, if this has process technical or cost advantages. Moreover, $ZrO_2$ can also be used in the antireflection layer 3, and $TiO_2$ and/or $Nb_2O_5$ in the color filter stack 4.

The interference antireflection layer 3 can be made antireflective in a first coating system on a large industrial scale. The coating process used here can be of the same type as used in a second system for the application of the color filter layer. Thus, for example, for both interference layer systems, sputter systems can be used, so that the additional, multilayered interference layer can then also be applied by sputtering onto a sputtered antireflection layer.

In both cases, a vapor deposition system can also be used for electron beam vaporization or for the thermal vaporization or for the ion-assisted coating. The use of CVD processes or sol-gel processes, such as, for example, immersion drawing is also conceivable.

It is also possible to carry out the antireflection with a type of coating process other than the subsequent coating process of the color filter stack. Thus it is possible in principle to combine each one of the above-mentioned coating methods with another one of the mentioned methods.

Figure 2:
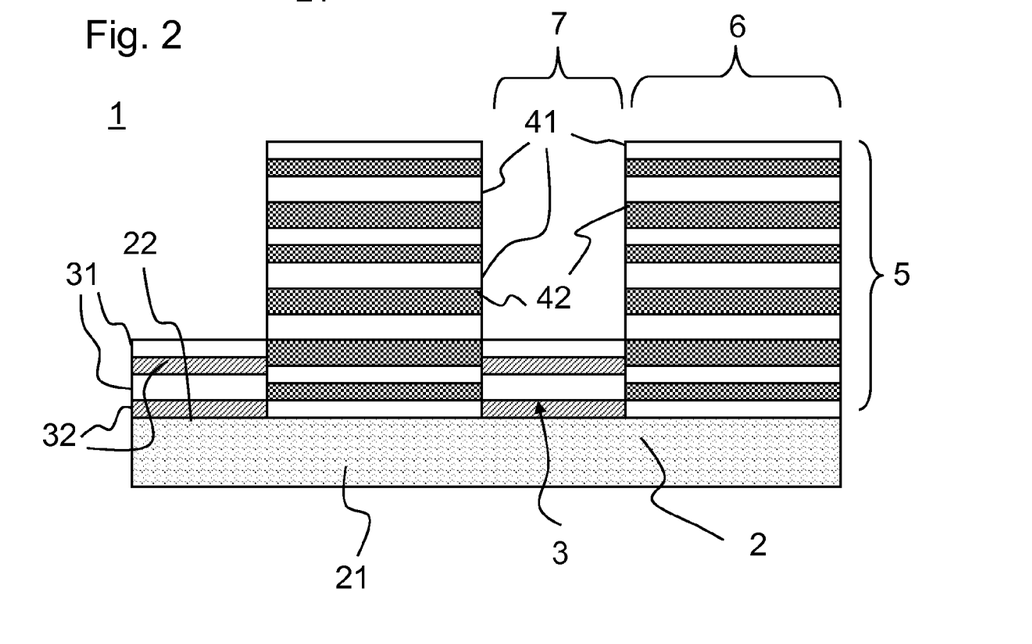
FIG. 2 shows, for comparison, a color filter with a structured antireflection layer.

In FIG. 2, for comparison, a conventionally produced color filter 1 is represented schematically on a substrate 2 that has been made antireflective. Here, after a first masking process, the antireflection layer 3 is applied first to areas 7 on the substrate that have been left uncovered by the masking. After the removal of the first mask, a second masking step is carried out, which has a shape that is complementary to the first mask, and thereby just covers the areas 7 that have remained uncovered in the first masking step. By means of the masking, the second coating process of the application of the desired original color filter design is carried out. Areas 7 and areas 6, which have been made antireflective, and which have been coated with the color filter, lie thus on the substrate 2 at predetermined places, completely separately from each other. The sequence of the two coating processes with, in each case, the associated masking processes, can here also be reversed, because the two coating processes, in contrast to the substrate coated according to the invention, are completely independent of each other. For this purpose, however, two masking processes have to be carried out, while only one masking process is necessary in the combined masking and coating method according to the invention.

Figure 3:
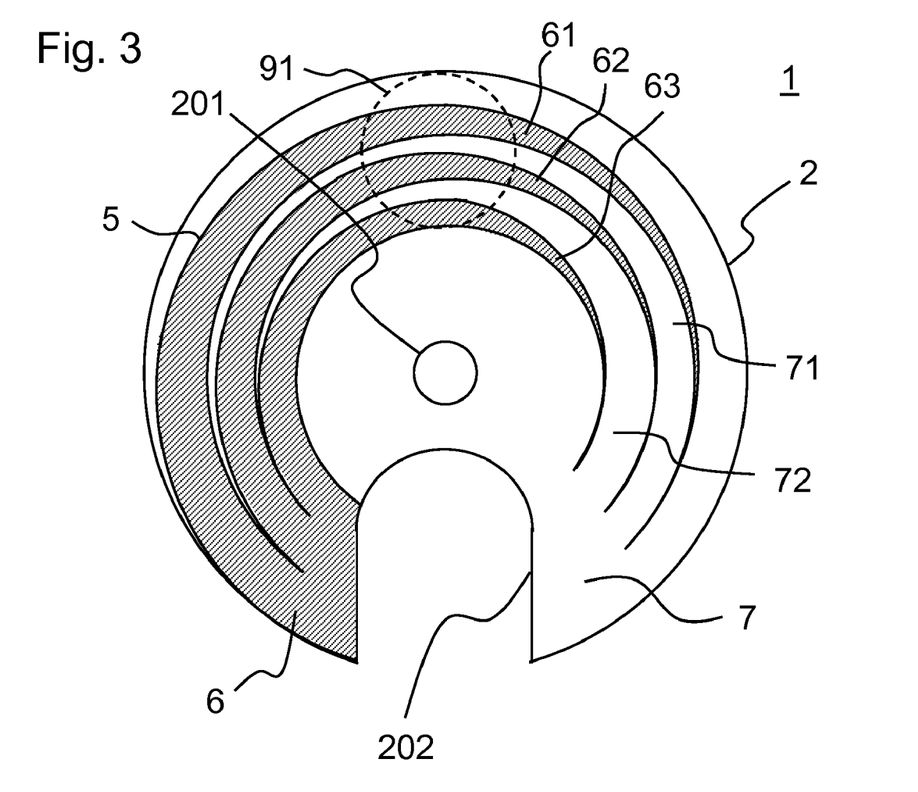
FIG. 3 shows a top view of a color filter with a circular base pattern.

FIG. 3 shows an example of a color filter 1 with a circular substrate 2. The substrate 2 has an opening 201 in the middle, by means of which the color filter is held rotatable on a shaft about its midpoint. At the margin of the disk-shaped substrate 2, a cut-out 202 is also present. The color filter 1 can then be positioned in such a way that the light of the illumination source passes through the cut-out. This is advantageous, for example, if completely white light is to be generated.

The color filter layer system 5 covers an area 6 of the substrate surface, which has tooth-shaped adjacently running partial areas 61, 62, 63 that narrow along their longitudinal direction. Because of the narrowing of the adjacently running area 61, 62, 63, the partial areas 71, 72 of the area 7, which are provided only with an antireflection layer, have a variable width in the direction along the teeth. The partial areas 61, 62, 63, and the partial areas 71, 72, run in a spiral pattern with curvature about the midpoint of the opening 210, i.e., the pivot point of the filter. Along the peripheral direction about the midpoint, as a result of the narrowing of the tooth-shaped areas 61, 62, 63, the surface proportions of the areas 6 and 7 vary. An area 91 of the substrate is illuminated by the floodlight. By the rotation of the color filter about the midpoint, the desired color saturation can then be obtained as a function of the portions of the areas 6 and 7 given in the area 91. In the position shown in FIG. 3, a color saturation of approximately 50% would result, for example. In the case of a 180° rotation, the illuminated area 91 would coincide with the cut-out 202, so that the light is not filtered.

Figure 4:
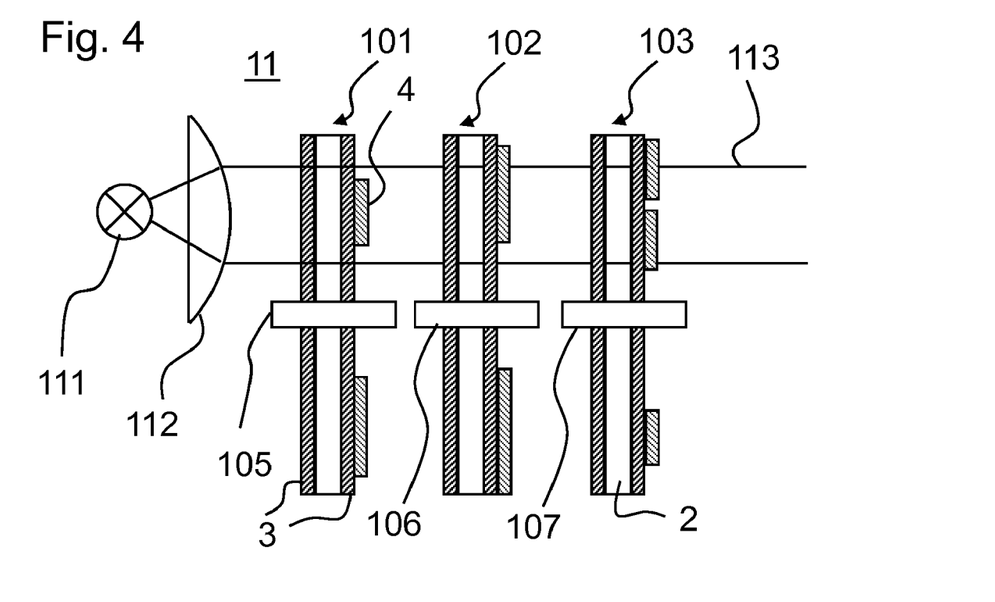
FIG. 4 shows a diagram of a floodlight with a set of adjustable color filters.

FIG. 4 shows, as an additional illustration, a diagram of a part of a floodlight 11 with several color filters 101, 102, 103 that have been made antireflective on both sides according to the invention. Using a condenser lens 112, a parallel beam 113 is generated from the light of an illumination source 111, for example, a high pressure discharge lamp. The color filters 101, 102, 103 are arranged in such a way that the parallel beam in each case illuminates an area between the axes 105, 106, 107 and the margin of the color filters 101, 102, 103. The color filters 101, 102, 103 are individually attached rotatably by means of the axles 105, 106, 107, so that in each case a desired color saturation can be adjusted. Each one of the colors reflects a certain, different part of the visible spectrum, or generates a color tint that differs from the other color filters. Here, a suitable set of color filters is one where the filters are designed as cyan, magenta and yellow filters.

A fully calculated example has shown that it may be advantageous from the point of view of process technology if the AR layer system contains a different high refractive index material than the color filter stack. For this purpose, a magenta color filter design was used as a starting point, similar in form to the color wheels of stage floodlights. $Nb_2O_5$ was chosen here as high refractive index material in this magenta filter.

Figure 5:
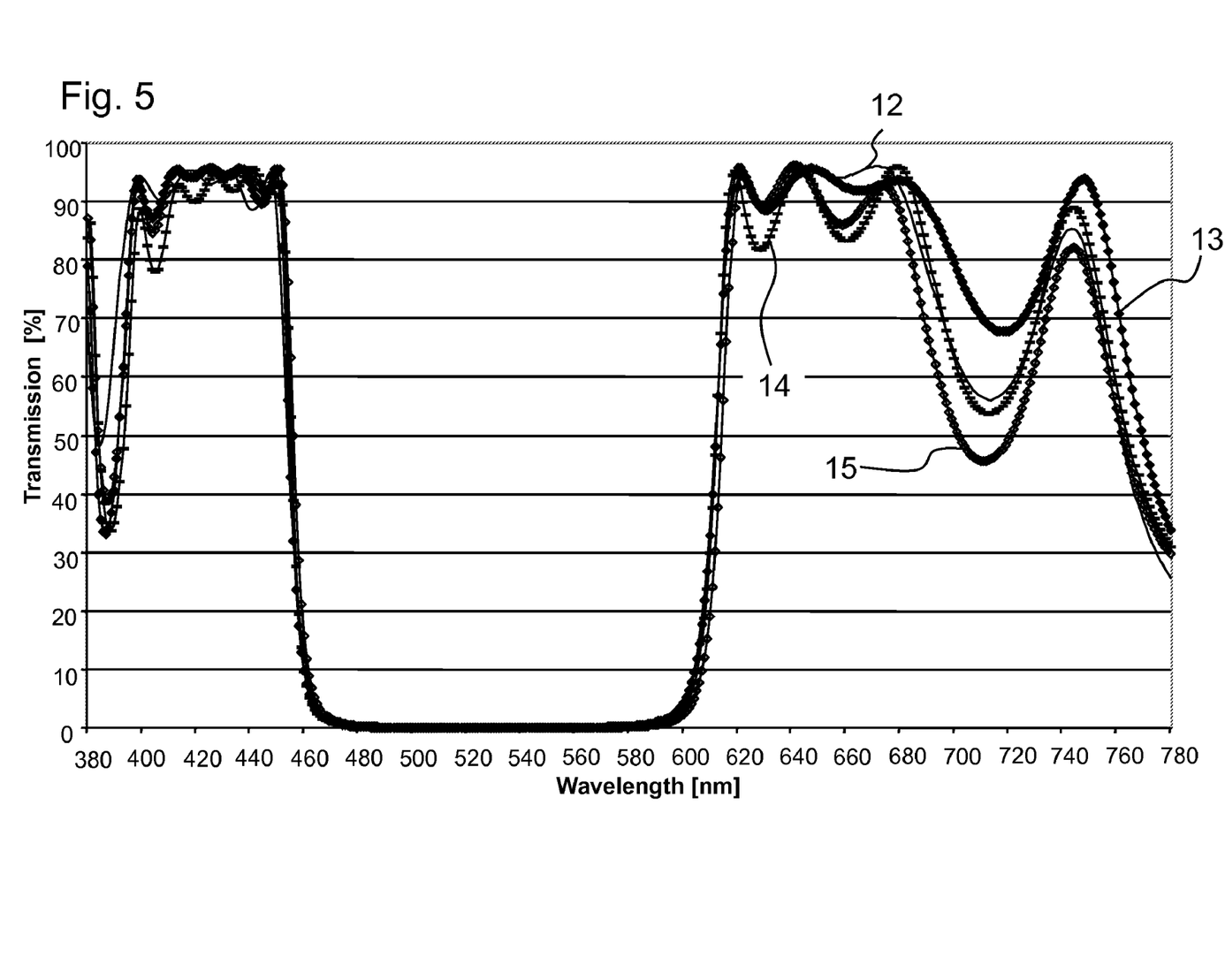
FIG. 5 shows different spectral profiles of the transmission of a magenta color filter designed with $Nb_2O_5$ as high refractive index material, and an underlying antireflection layer, also with $Nb_2O_5$ as high refractive index material.

FIG. 5 shows the spectral profile 15 of this magenta design, which was chosen as an example.

Under this original color filter design, in a competition program for optical thin films (in this case TFCalc, although another thin film program can also be used, such as Essential Macleod), an antireflection design, which had been chosen as an example, was then placed, in the first case considered also with $Nb_2O_5$ as high refractive index material.

The original color filter design with AR layers located under it in a common layer structure can then no longer reach the previously existing chromatic coordinate of the original magenta design, because the AR layers, which are now in a bottom position, interfere with the above-lying layer sequence of the original magenta design, and, as a result, the chromatic coordinate of the common layer packet is shifted with respect to the initial value. This can be seen in the spectral profile 12, also shown in FIG. 5, of the original magenta design, which is held in a fixed position, together with the underlying AR layers, because, in this case, the spectral curve profile differs clearly from the original magenta design without AR layers (spectral profile 15).

To be able to reach the originally desired chromatic coordinate of the original magenta design even in the case of AR layers that lie beneath, the layers of the color filter stack to be applied have to be adapted. For this purpose, the layers of the AR layer system are held fixed in the layer thickness sequence in the thin film program, while the layers of the color filter to be applied, i.e., the layers of the original magenta design, are uncovered for the optimization.

After the optimization has been carried out, a modified color filter stack is located on the original AR system, corresponding to the optimized additional, multilayered interference filter layer, which now, together with the underlying layers of the antireflection layer, again reaches precisely the desired original chromatic coordinate, if the set points in the optimization program were set appropriately.

The spectral curve will again closely resemble the original shape of the original color filter design after the optimization, at least in the portion of the visible range of the spectrum that is relevant to the human eye, provided that the target conditions have been set appropriately in the optimization routine. The spectral curve 13, which results after the optimization has occurred, is represented in FIG. 5.

FIG. 5 also shows how the spectral profile of the optimized color filter stack would appear without the underlying AR layers (spectral profile 14). This color filter stack alone, if applied to a substrate that was not antireflective-coated, would also not reach the desired chromatic coordinate, as one can suspect from the strongly wavy variations of the spectral profile. It is only in combination with the previously applied predetermined antireflection design that the subsequently applied color filter stack is capable of reaching the desired chromatic coordinate. The application of a color filter design that has been adapted especially to the underlying antireflection design used in each instance is thus an essential component of this invention.

However, it is not sufficient to reach the originally predetermined chromatic coordinate of the common layer packet to implement the entire process technically. It is also important, besides the theoretically correct chromatic coordinate in the ideal case, for all the individual layers to be deposited at the precise theoretically correct layer thickness, having, even in the overall layer packet 5, no excessively high sensitivity of the chromatic coordinates to individual variations in the layer thicknesses. For this purpose, it is important that the layer of the additionally applied AR design interact with the layers of the subsequently applied color filter stack.

For the determination of the sensitivity of the individual layers of a layer packet, it is thus possible to calculate the so-called "first-order layer sensitivity." This property of the individual layers of a layer packet describes to what extent (the so-called "merit function") the target value deviates in the target function in the case of a small change in the layer thicknesses of the individual layer in question from the found minimum (in the case of the optimum).

The target function here consists of the individual goals that are predetermined for the optimization; for example, target values, such as spectral transmission or reflection values for certain wavelength ranges or chromatic coordinate targets (chromatic coordinate coordinates for a certain illumination source).

In the case of a color filter stack that has been applied to a fixed predetermined AR layer packet, the overall layer packet, however, is not located in the overall minimum of the target function, because the first layers that are part of the antireflection in the optimization process are not uncovered for the optimization. Rather, the layer thicknesses of the multilayered antireflection layer are predetermined and held fixed, and then the layer thicknesses of the other layers, or the layers of the additional, multilayered interference filter layer are calculated.

Therefore, only the first-order layer thickness sensitivity ("first-order layer sensitivity") and not the second-order layer thickness sensitivity ("second-order layer sensitivity") is calculated, which would make sense only in the case of a completely optimized layer design, in which all the layers were successfully optimized completely to the end.

The value of the absolute data on first-order layer thickness sensitivity here has no direct significance, because it depends on the number and "hardness" (tolerance) of the set individual targets. Only the relative level of this value of the individual layers with respect to each other has a meaning, and it indicates the level of the "relative sensitivity" of the individual layers in the layer packet with respect to the totality of the set target. Here, high positive values denote relatively strong worsening of the quality or performance ("merit function"), while high negative values represent a relative improvement of the performance function.

Large negative values, however, do not mean that this layer system can be run in a stable way during production, rather this only means that, if individual variations occur for these layers in question, the deviations do not fatally lead in the wrong direction, i.e., particularly away from the desired chromatic coordinate. Nevertheless, large values, even large negative values, always indicate a strong variation of the target value and thus particularly of the predetermined chromatic coordinate. However, in general, very large negative values should be expected only for the layers in the overall layer system that have not been uncovered in the optimization process, i.e., in the case of the invention for the layers of the AR stack.

Figure 6:
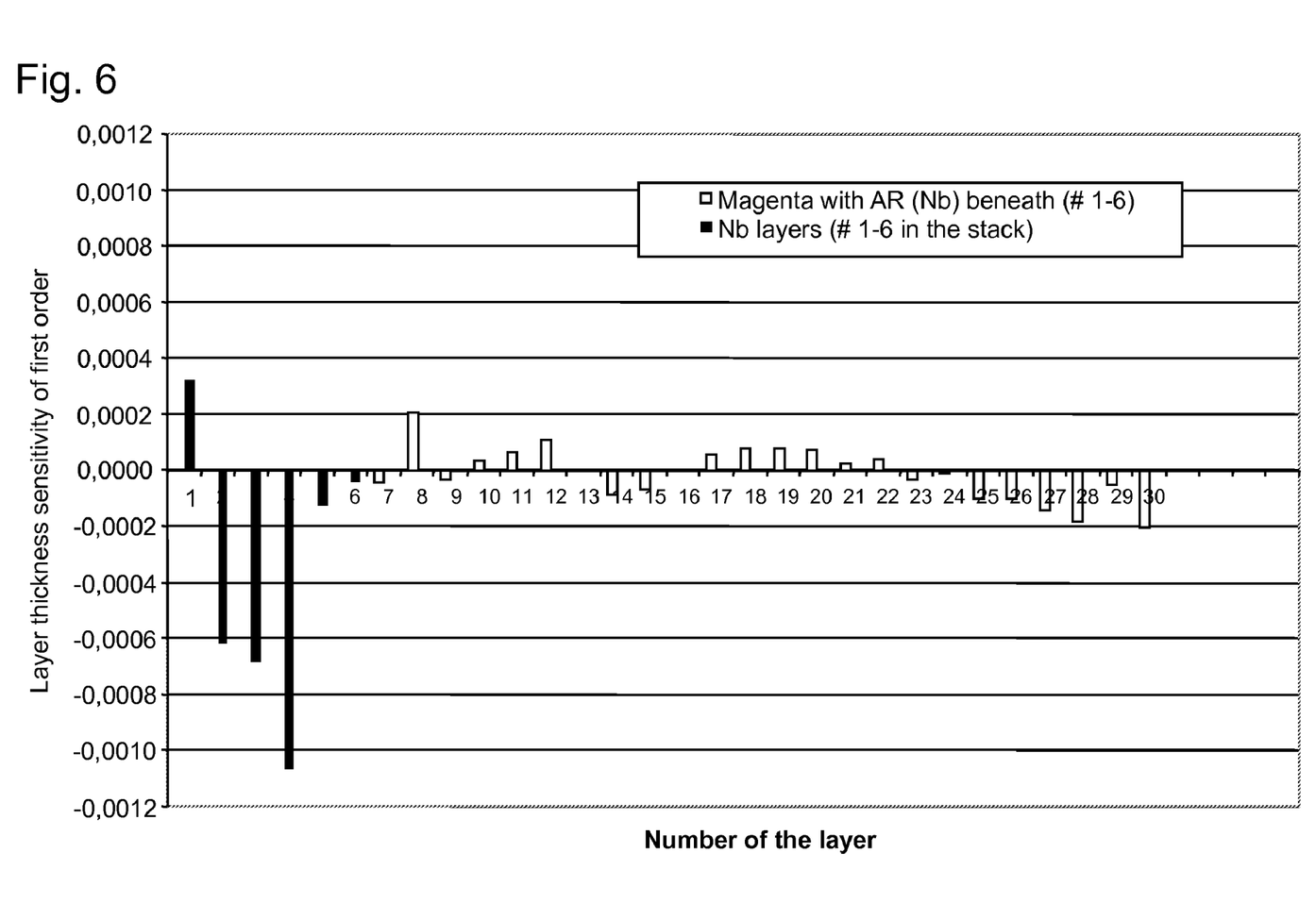
FIG. 6 shows calculated values of the relative sensitivity of the individual layers of a color layer system to variations in the layer thicknesses, with an underlying six-layer antireflection layer.

FIG. 6 shows the values of the relative sensitivity, which have been calculated in this way, for the individual layer thicknesses of the given Nb-based interference antireflection layer (layers with the indexes 1 to 6 of the overall layer system, or of the color filter layer system with a total of 30 layers) located on the substrate and beneath the additional, multilayered interference filter layer. Here, the layer with the index 1 is the lowermost layer, and arranged on the substrate, and the layer with the highest index, i.e., the layer with the number 30, is the uppermost layer of the color filter layer system.

One can see that the values are for the most part negative, but relatively large in their absolute value, in comparison to the lower values, on average, of the layers of the color filter stack (layers with indexes 7 to 30). Thus, although this overall system is not very sensitive, it is also not extremely insensitive to individual variations in the layer thicknesses, particularly those of the first six layers of the antireflection design.

Figure 7:
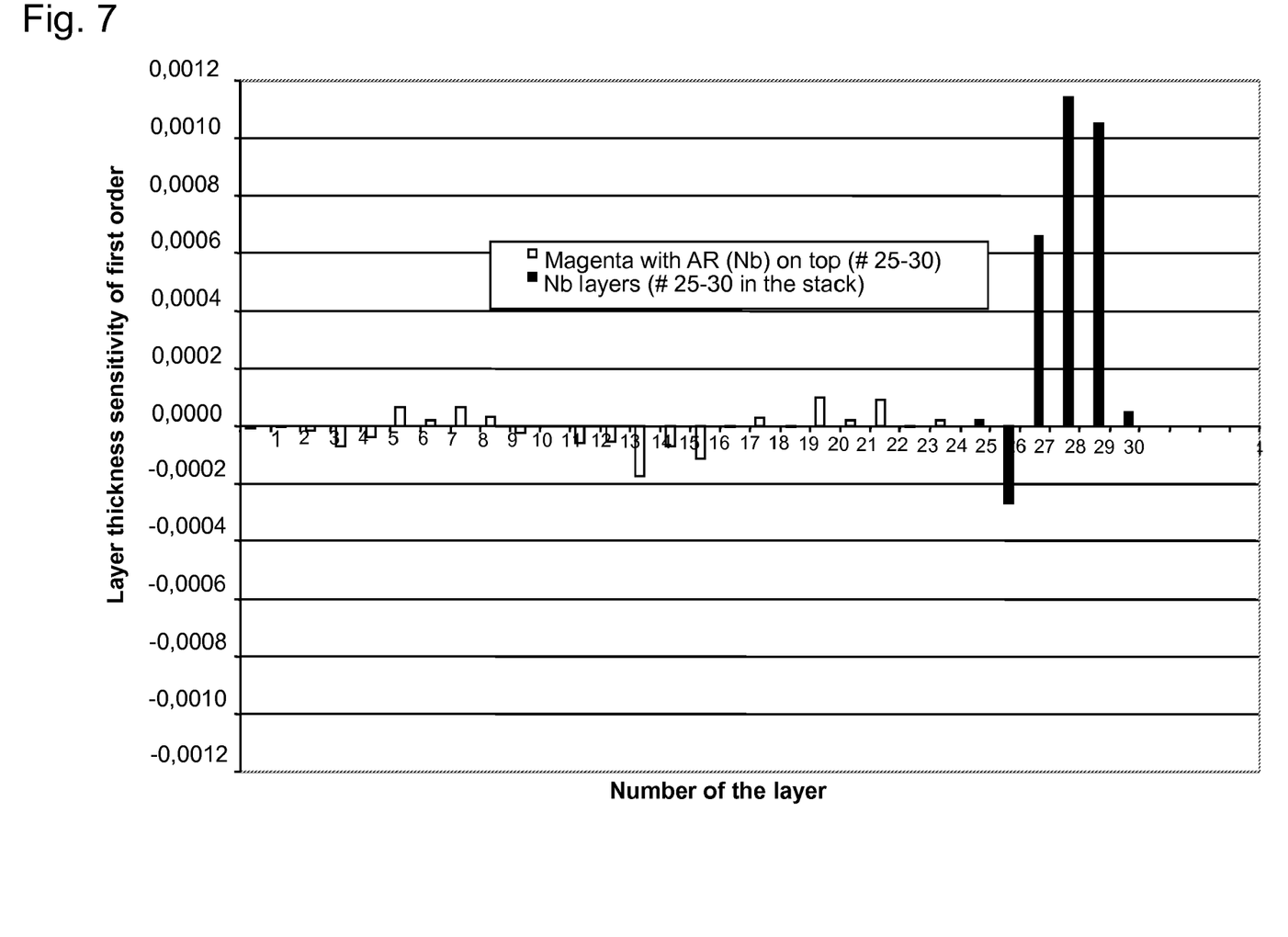
FIG. 7 shows calculated values of the relative sensitivity of the individual layers of a corresponding color layer system to variations in the layer thicknesses, with a superposed six-layer antireflection layer.

For comparison, FIG. 7 shows the relative layer thickness sensitivity of the magenta design, on which, in contrast to the invention, the six layers of the antireflection design have been applied later. This is the same AR layer design on an Nb base as in the case of FIG. 6.

However, in this case, layers # 25-30 of the AR layer packet are held fixed by carrying out the optimization, and layers # 1-24 are accordingly uncovered. FIG. 7 shows that, in this case as well, the layer thickness sensitivity of the AR layers is relatively high in comparison to the sensitivity of the layers of the color filter stack in the overall layer system; however, this time, the individual layers of the AR stack have on average even very high positive values. Thus, for such an overall layer system, one would expect that the individual layers of the AR stack react very unfavorably to small individual variations, and that thus particularly a narrow predetermined chromatic coordinate of the overall layer system could be maintained only with great difficulty.

The invention therefore shows that an interference antireflection layer that has been applied first has clear advantages with regard to unchanging product quality, compared to an antireflection layer that has been deposited later on a multilayered interference filter layer.

The two cases that have been considered so far used, as starting point, an antireflection design with $Nb_2O_5$ as high refractive index material, which was combined with a color filter stack that had also been structured on the basis of $Nb_2O_5$. The low refractive index material here was $SiO_2$, as is usually the case.

Figure 8:
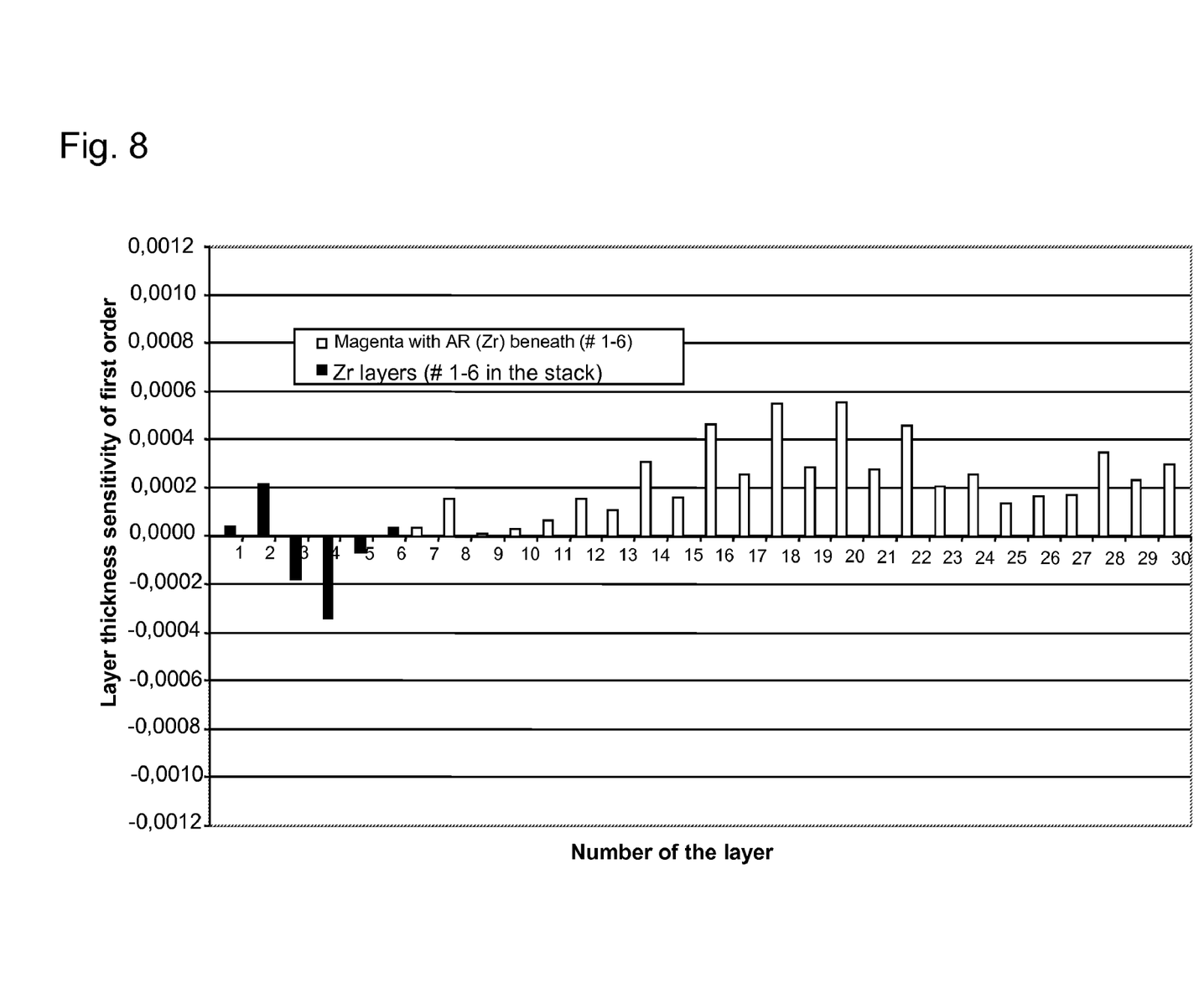
FIG. 8 shows calculated values of the relative sensitivity of the individual layers of a color layer system compared to the variations in the layer thicknesses, with an underlying six-layer antireflection layer, where the materials of the highly refractive layers of the antireflection layer and of the additional, multilayered interference layer differ from each other.

FIG. 8 shows the result of the calculation of the layer thickness sensitivity of an antireflection design based on $ZrO_2$ as high refractive index material. The design here is also a 6-layer antireflection design, as in the previous case with $Nb_2O_5$ as high refractive index material. The material of the layers with high refractive index, i.e. the layer stack of layers 7-30, is also $Nb_2O_5$, as in the examples of FIGS. 6 and 7. Thus, in the example shown in FIG. 8, the interference antireflection layer and the additional, multilayered interference filter layer in each case have layers with a first refractive index and layers with a higher refractive index, where, however, the layers with higher refractive index of the additional, multilayered interference filter layer were produced from a material that differs from the layers with high refractive index of the interference antireflection layer.

As was observed unexpectedly, the values as far as height is concerned are much lower than the values in the two previous cases, and the values tend to be negative rather than positive values. A rough estimate shows that the height of the "first-order layer sensitivity" values in this case would only be approximately one third of the average height in the two other cases. Thus, such a design, in practice and with narrowly given set points of the overall layer system, particularly in case of narrow chromatic coordinate requirements, can be produced in a clearly more stable way than the niobium based designs in the two previous cases of FIGS. 6 and 7.

FIGS. 6 and 8 illustrate the following properties, which are given in general without any limitations to the examples of layer designs according to the invention in particularly advantageously variants that are shown in the figures:

the maximum of the first-order layer thickness sensitivity of all the layers of the multilayered antireflection layer is smaller than the maximum of the first-order layer thickness sensitivity of all the layers of the additional, multilayered interference filter layer. In the example shown, the layer with the index 2 has the highest first-order layer thickness sensitivity among the layers 1 to 6 of the interference antireflection layer. This value is smaller than, for example, the values of the layers 18 and 20. For the rest, the layer thickness sensitivities of the interference antireflection layer are even lower in magnitude than the maximum amount of the layer thickness sensitivities of the additional, multilayered interference filter layer.

The mean first-order layer thickness sensitivity is also lower for the layers of the interference antireflection layer than the mean first-order layer thickness sensitivity for the layers of the additional, multilayered interference filter layer. This applies to the example shown in FIG. 6 with identical high refractive index materials, as well as to the examples shown in FIG. 8.

For the example with different high refractive index materials in the antireflective layer, as shown in FIG. 8, and the additional, multilayered interference layer, this also applies to the mean value.

Accordingly, with a view to these characteristics, the invention also provides a color filter 1 for the generation of colored light fields for illumination purposes, having on a flat transparent substrate 2, over the entire surface, an interference antireflection layer 3 at least on one side 21, 22, particularly preferably on both sides, where an additional multilayered interference filter layer 4 is deposited on the masked side 22 that comprises alternately first and second layers 41, 42, where the first layers 41 have a first refractive index, and the second layers 42 have a second refractive index that is higher than the first refractive index of the first layers 41, and where the interference antireflection layer 3 has at least one first and at least one second layer 31, 32, where the refractive index of the second layer 32 is higher than the refractive index of the first layer 31, and where the layer thicknesses of the additional, multilayered interference filter layer 4 are designed, taking into consideration the underlying interference antireflection layer 3, in such a way that the additional, multilayered interference filter layer 4, together with the interference antireflection layer 3, produces a color filter layer system 5, which has at least one edge in the transmission spectrum in the visible spectral range, which separates a reflecting wavelength range from a wavelength range within which light is transmitted by the color filter layer system, and where the additional, multilayered interference filter layer 4 covers at least one first area 6 of the substrate 2 and leaves uncovered at least one second area 7, and the second area is made antireflective as a result of the interference antireflection layer 3, where at least one of the following properties is satisfied:

a) the maximum of the first-order layer thickness sensitivity of all the layers of the multilayered antireflection layer is smaller than the maximum of the layer thickness sensitivity of the first order of all the layers of the additional, multilayered interference filter layer, b) the amount of the maximum of the first-order layer thickness sensitivity of all the layers of the multilayered antireflection layer is smaller than the amount of the maximum of the first-order layer thickness sensitivity of all the layers of the additional, multilayered interference filter layer, c) the mean of the layer thickness sensitivities of first order of all the layers of the multilayered antireflection layer is smaller than the mean of the layer thickness sensitivities of first order of all the layers of the additional, multilayered interference filter layer, and d) the magnitude of the mean of the layer thickness sensitivities of first order of all the layers of the multilayered antireflection layer is smaller than the amount of the mean of the layer thickness sensitivities of first order of all the layers of the additional, multilayered interference filter layer.

Figure 9:
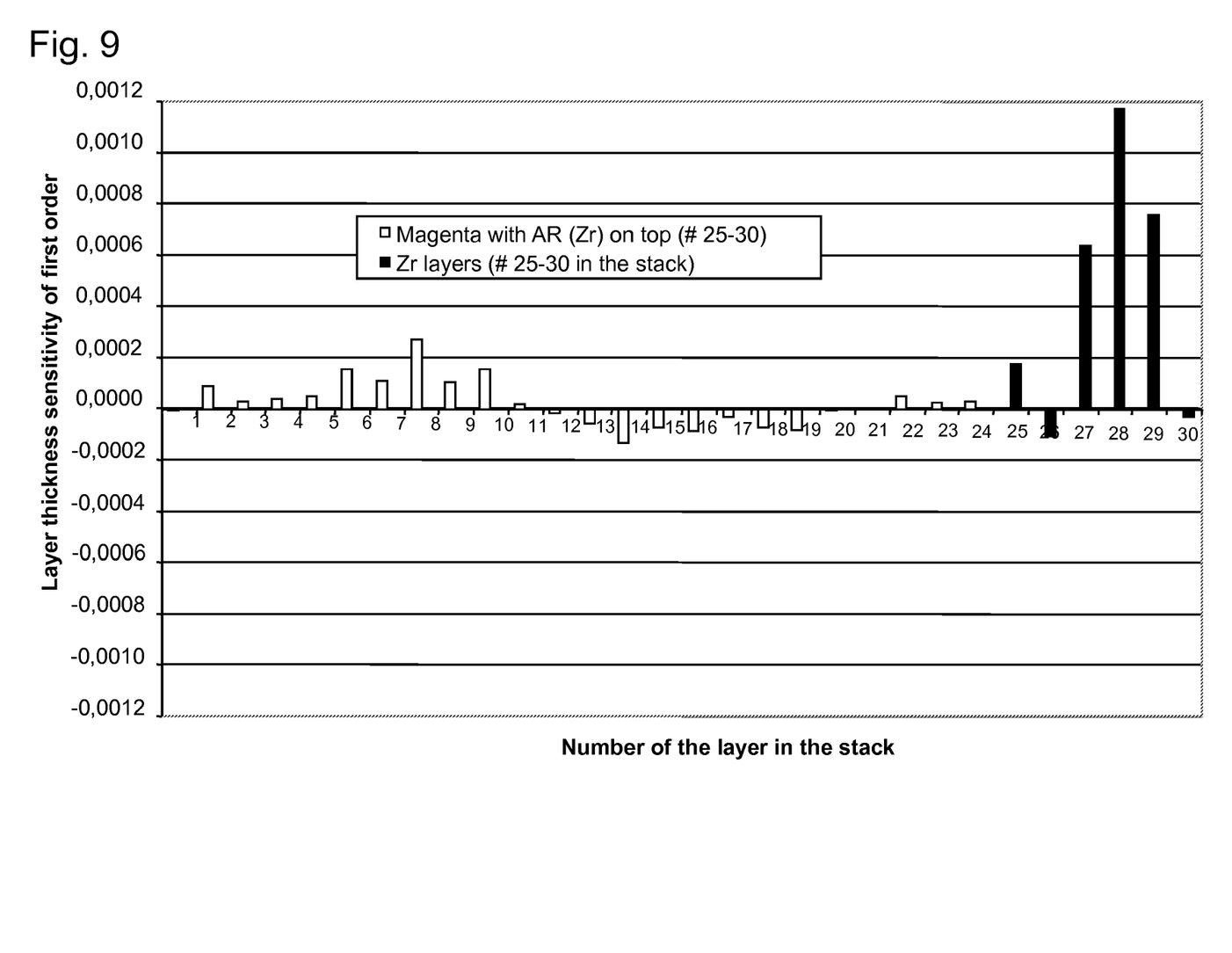
FIG. 9 shows, for comparison with FIG. 8, calculated values of the relative sensitivity of the individual layers of the color layer system to the variations in the layer thicknesses, with a superposed six-layer antireflection layer, where the materials of the highly refractive layers of the antireflection layer and of the additional, multilayered interference filter layer differ from each other.

FIG. 9 shows, for comparison with FIG. 8, the case where the same $ZrO_2$-based antireflection design is applied later, not beneath the color filter stack, as represented in the third example, but on the magenta color filter. Thus, the procedure for carrying out the optimization according to FIG. 9 corresponds to the case of the second example (FIG. 7).

As one can see from FIG. 9, the layer thickness sensitivity in this case is approximately as high as in the second case. Thus, no fundamental difference can be recognized between the two cases, where the antireflection design is applied later on top of the color filter stack. In this case, the layer thickness sensitivity to be expected of the antireflection layers is relatively high in the overall layer design, and a stable production in case of narrow target set points cannot be expected.

Figure 10:
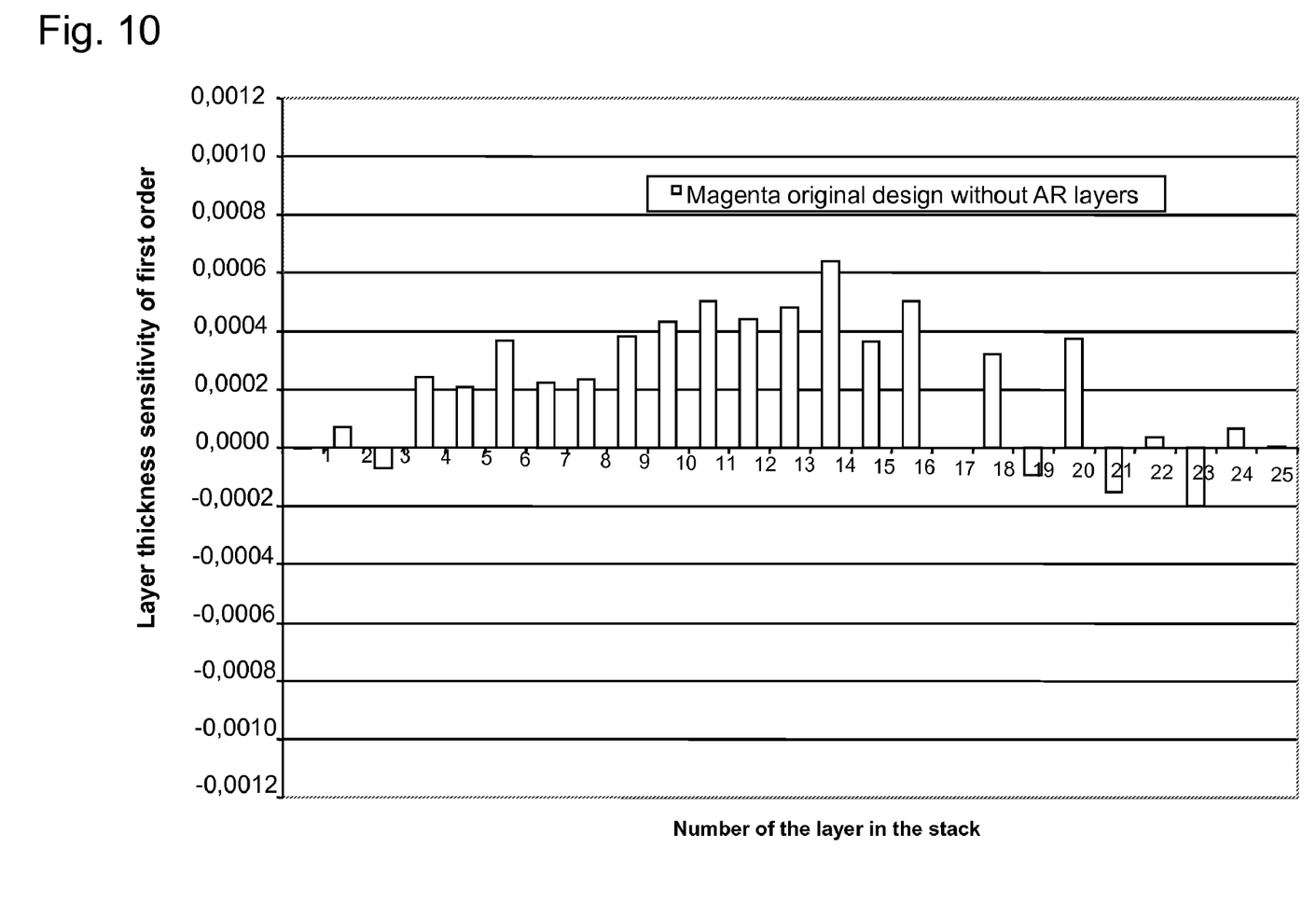
FIG. 10 shows calculated values of the relative sensitivity of the individual layers of the additional, multilayered interference filter layer without antireflection layer.

FIG. 10 shows the layer thickness sensitivity of the original magenta layer design. This design contains no stack with AR layers, and all the layers can consequently be uncovered for the optimization.

The height and the distribution of the layer thickness sensitivities of the individual layers of the additional, multilayered interference filter layer very much resemble the distribution of the sensitivities of the associated layers in the four indicated examples with the underlying AR stack or the stack that has been applied later on top, and is an indication that the uncovered layers of the color filter stack have not been changed substantially during the optimizations that have occurred, in terms of their fundamental layer sequence, due to the optimization algorithm.

Figure 11:
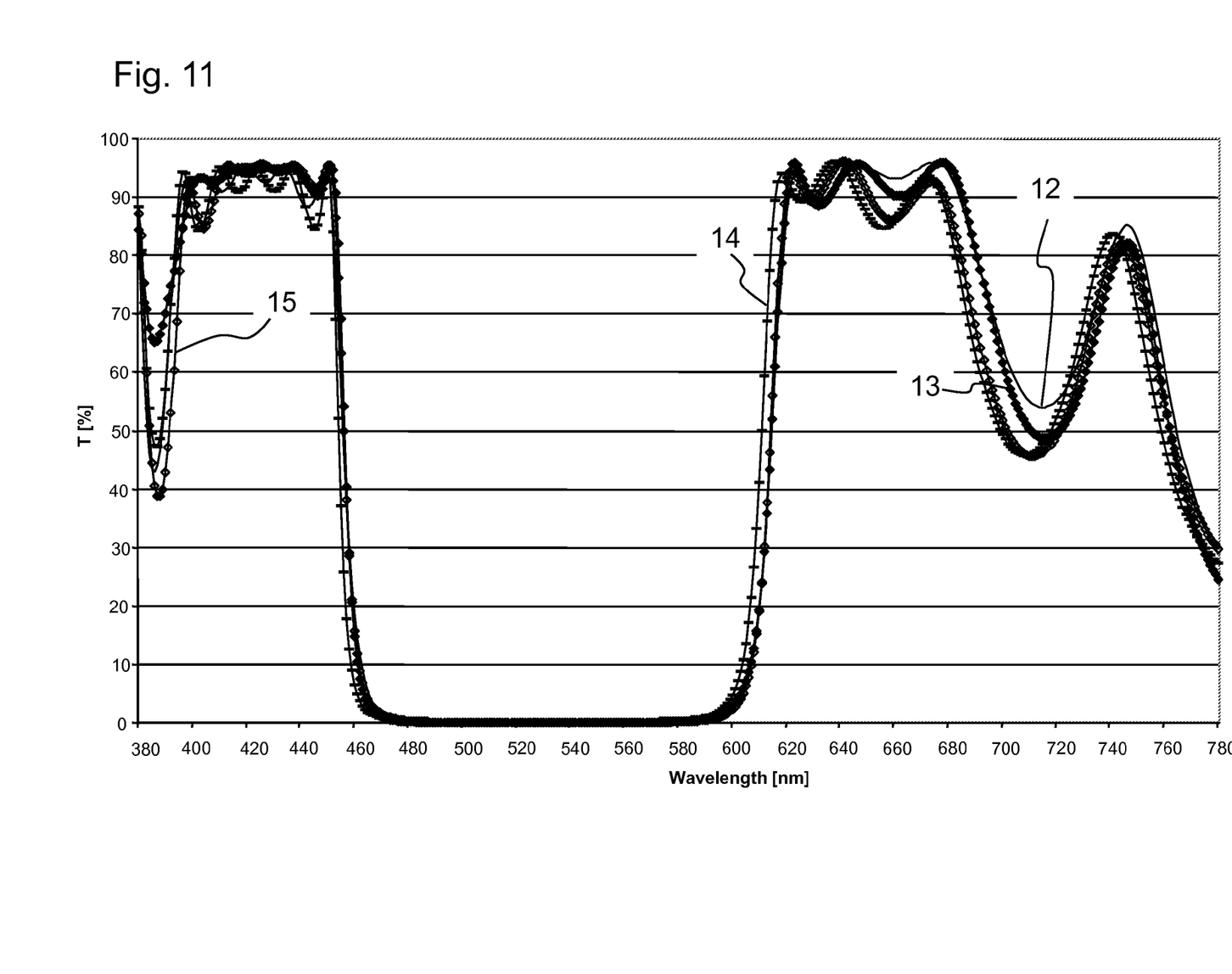
FIG. 11 shows spectral curves analogous to the representation in FIG. 5, but with $ZrO_2$ as highly refractive material in the antireflection layer instead of $Nb_2O_5$.

In FIG. 11, the spectral curves are shown analogously to the representation in FIG. 5; but this time, for the case of the chosen antireflection design with $ZrO_2$ as high refractive index material, i.e., in accordance with the example explained in reference to FIG. 8.

From the course of the spectral curve 13 in FIG. 11 of the optimized magenta color filter design with the underlying AR stack on Zr basis, one cannot see at first glance whether the spectral profile reacts more sensitively to small individual variations of the individual layer thicknesses of the AR stack with regard to chromatic coordinate than the corresponding spectral curve 13 in FIG. 5 with the underlying AR stack on an Nb basis.

However, in principle it is possible, with "TFCalc," the film thickness calculation program used, to calculate how strongly the layer thickness sensitivity of the individual layers will affect the stability of the chromatic coordinates of the overall layer system 5. For this purpose, the initial instructions indicate how large the expected variations of the individual layers are, and what the relative distribution of these variations are.

In the analysis that was carried out in this regard, the starting assumption was a variation of the individual layer thicknesses in the layer design of a maximum of 2 nm (toward thicker as well as thinner layers). This assumption applies to all of the layers considered, regardless of their nominal starting thickness. Furthermore, it was assumed that the height of the maximum 2-nm thick layer thickness variations are distributed in a normal distribution about this maximum value. For this analysis, 200 steps were carried out in each case. The chromatic coordinates were calculated here for an assumed black-body radiator with a nominal color temperature of 5500 K.

However, only the six layers of the given AR stack are included in the theoretical analysis, because the purpose was only to make a statement regarding the layer thickness sensitivity of the AR layers in the overall layer system.

Figure 12:
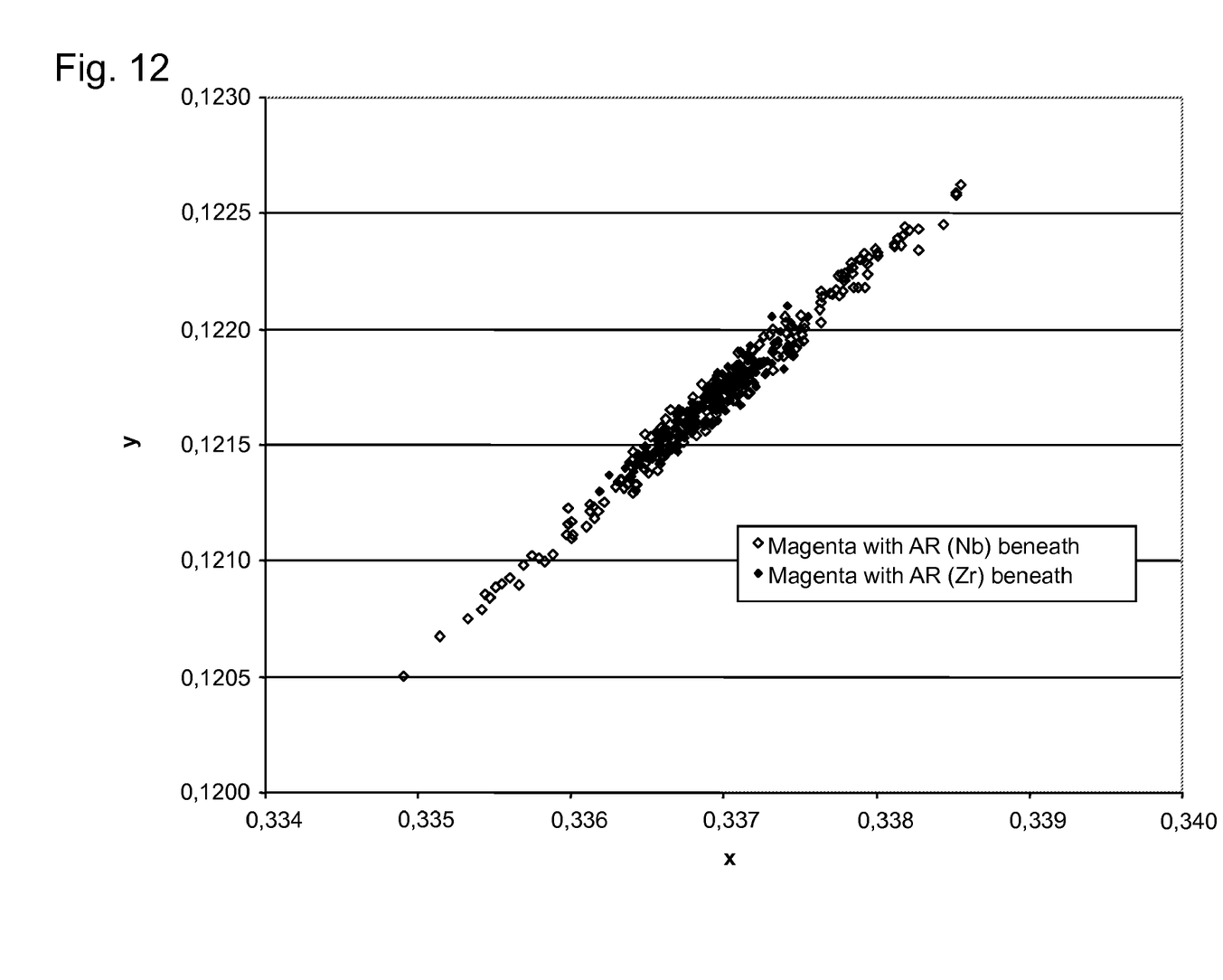
FIG. 12 shows the result from 200 individual calculations of variations in the chromatic coordinate for two color layer systems with underlying antireflection layers according to the invention, which, in one case, have layers based on niobium, and, in the other case, based on zirconium.

FIG. 12 shows the result of the 200 individual calculations for the two cases, in which the antireflection layers were applied first, and consequently were located under the color filter stack. These two cases correspond to the cases from FIG. 6 (on an Nb base) or FIG. 8 (on a Zr base). One can clearly observe that the average expected variations at the chromatic coordinate were observed to be clearly smaller in the case of the Zr-based design than in the case of the Nb-based antireflection design.

It is easy to estimate from the diagram that the mean variation of the color coordinates in the case of the Zr-based AR design is only approximately one third of the mean variation of the Nb-based AR design, as already expected from the comparison of the height of the layer thickness sensitivity from FIG. 6 and FIG. 8.

Figure 13:
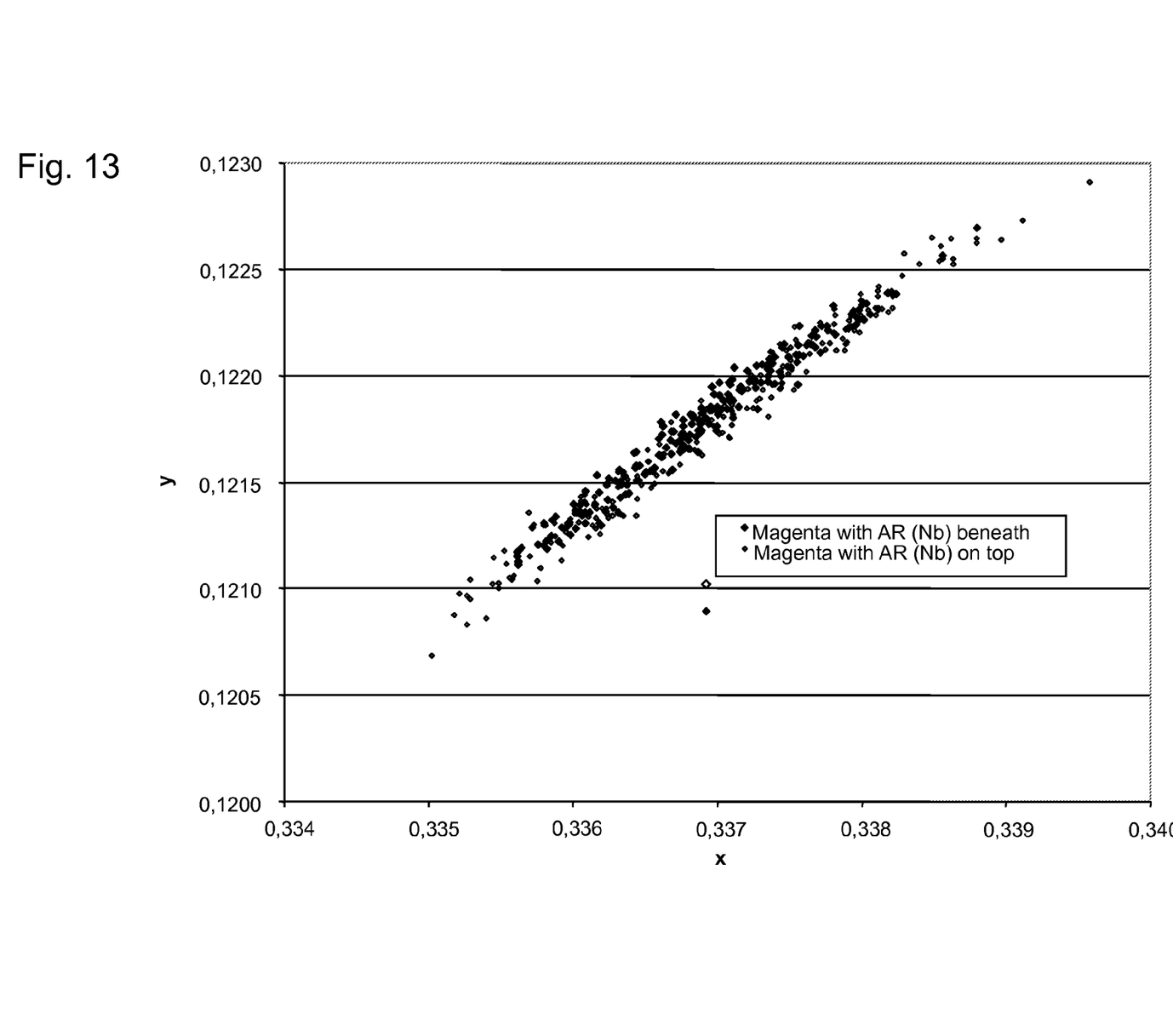
FIG. 13 shows, for comparison, the same calculation for color layer systems with corresponding superposed antireflection layers.

FIG. 13 shows the results of the 200 individual calculations for the two cases in which the antireflection layers were applied later on the previously applied color filter stack. These two cases correspond to the cases from FIG. 7 (on an Nb base) or FIG. 9 (on a Zr base). In these two cases, the chromatic coordinate variations that occur in each case are relatively large in comparison to the much smaller average variation, as can be seen in FIG. 12 (for the Zr-based antireflection design), i.e., in the case of a design according to FIG. 8. The average variations in the two cases shown in FIG. 13 correspond approximately to the height of the average variations in the case of the Nb-based design from FIG. 12 in accordance with a layer design according to FIG. 6.

From this, the following conclusion can be drawn:

A more stable production can be expected based on the analyses performed, particularly for the cases where the color filter stack, or the additional, multilayered interference filter layer was applied later to the already coated AR stack.

Surprisingly, the layer thickness sensitivity to be expected theoretically of the layers of the AR stack in the overall system in the chosen example is clearly lower, if, for the high refractive index material in the antireflection design, a different material is chosen than for the high refractive index material that was used in the color filter stack.

From this one can conclude that there is a technical advantage if different materials are used for the two high refractive index materials of the AR stack and of the color filter stack. This technical advantage can be combined particularly advantageously with the economic advantage represented in the introduction, if the substrate, which has been made antireflective on one or both sides in a large industrial-scale system, were to be prepared with a different high refractive index material than that for the color filter stack applied later in another coating system.

Here, the coating system does not necessarily have to be different, rather it could be the same coating system with which first the one- or two-sided antireflection treatment was carried out, in a cost effective way, for example onto larger substrates, followed by the separation of these larger substrates in accordance with the desired geometry of the individual color filters, and then the individual substrates run through a masking process, and the masked substrate is then provided in the same system with the calculated color filter stack. Here it would also be possible, to use another high refractive index material for this second coating process, in the same system.

The invention claimed is:

1. A color filter (1) for the generation of colored light fields for illumination purposes, comprising:
    on a flat transparent substrate (2), an interference-antireflection layer (3) at least on one side (21, 22), where
    an additional, multilayered interference filter layer (4) is deposited on the masked side (22), which layer comprises alternately first and second layers (41, 42), where the first layers (41) have a first refractive index and the second layers (42) have a second refractive index, which is higher than the first refractive index of the first layers (41), and where
    the interference-antireflection layer has at least one first and at least one second layer (31, 32), where the refractive index of the second layer (32) is higher than the refractive index of the first layer (31), and where
    the layer thicknesses of the additional, multilayered interference filter layer (4), taking into consideration the underlying interference-antireflection layer (3), are designed in such a way that the additional, multilayered interference filter layer (4), together with the interference-antireflection layer (3) produce a color filter layer system (5), which has at least one edge in the transmission spectrum in the visible spectral range, which separates a reflecting wavelength range from a wavelength range within which light is transmitted through the color filter layer system, and where
    the additional, multilayered interference filter layer (4) covers at least one first area (6) of the substrate (2) and leaves uncovered at least one second area (7), and the second area is made antireflective as a result of the interference-antireflection layer (3).

2. The color filter according to claim 1, wherein the material of the second layer (42) of the additional, multilayered interference filter layer (4) and of the at least one second layer (32) of the interference-antireflection layer (3) differ from each other.

3. The color filter according to claim 1, wherein the additional, multilayered interference filter layer (4), taking into consideration the interference-antireflection layer (3), is designed in such a way that on average at least 75% of the light is reflected in a reflecting wavelength range with a spectral width of at least 60 nm, which abuts against the edge.

4. The color filter according to claim 1, wherein the additional, multilayered interference filter layer (4) has at least 15 layers.

5. The color filter according to claim 1, wherein the color filter layer system is arranged on adjacent tooth-shaped areas (6), which narrow along the longitudinal direction, on the substrate (2), so that, as a result of the narrowing of the adjacent areas, the areas (7) that are provided only with the antireflection layer have a variable width in the direction along the teeth.

6. The color filter according to claim 5, wherein the tooth-shaped areas (6) run in a circular pattern or a spiral pattern with curvature about a rotation point.

7. The color filter according to claim 1, wherein the substrate (2) has a cut-out, to set the color filter (1) in such a way in the light path of an illumination device that the light passes at least partially through the cut-out.

8. The color filter according to claim 1, wherein the maximum of the first-order layer thickness sensitivity of all the layers of the multilayered antireflection layer is smaller than the maximum of the first-order layer thickness sensitivity of all the layers of the additional, multilayered interference filter layer (4).

9. The color filter according to claim 8, wherein the amount of the maximum of the first-order layer thickness sensitivity of all the layers of the multilayered antireflection layer is smaller than the amount of the maximum of the first-order layer thickness sensitivity of all the layers of the additional, multilayered interference filter layer (4).

10. The color filter according to claim 1, wherein
    the mean of the layer thickness sensitivities of first order of all the layers of the multilayered antireflection layer is smaller than the mean of the layer thickness sensitivities of first order of all the layers of the additional, multilayered interference filter layer (4), or in that
    the amount of the mean of the layer thickness sensitivities of first order of all the layers of the multilayered antireflection layer is smaller than the amount of the mean of the layer thickness sensitivities of first order of all the layers of the additional, multilayered interference layer (4).

11. An illumination device with at least one movable, variably adjustable color filter (1) according to claim 1.

12. The illumination system according to claim 11, wherein multiple color filters (1) are arranged one after the other along the light path, and in each case, their edges have edges at different places of the visible spectral range.

* * * * *